(12) United States Patent
Widitora et al.

(10) Patent No.: US 10,278,410 B2
(45) Date of Patent: May 7, 2019

(54) FOOD CONTAINER INDUCTION HEATING SYSTEM HAVING POWER BASED MICROBIAL LETHALITY MONITORING

(71) Applicant: Silgan Containers LLC, Woodland Hills, CA (US)

(72) Inventors: Alvin Widitora, Los Angeles, CA (US); Douglas C. Miller, San Ramon, CA (US); George Sadler, Geneva, IL (US); Jianwen Hu, Oconomowoc, WI (US); Gerald Baker, Wauwatosa, WI (US)

(73) Assignee: Silgan Containers LLC, Woodland Hills, CA (US)

( * ) Notice: Subject to any disclaimer, the term of this patent is extended or adjusted under 35 U.S.C. 154(b) by 87 days.

(21) Appl. No.: 15/260,885

(22) Filed: Sep. 9, 2016

(65) Prior Publication Data

US 2016/0374372 A1    Dec. 29, 2016

Related U.S. Application Data

(63) Continuation of application No. PCT/US2015/026136, filed on Apr. 16, 2015.
(Continued)

(51) Int. Cl.
*H05B 6/02* (2006.01)
*A23L 3/02* (2006.01)
(Continued)

(52) U.S. Cl.
CPC .............. *A23L 3/022* (2013.01); *A23L 3/04* (2013.01); *B65B 55/06* (2013.01); *B65D 81/34* (2013.01); *H05B 6/108* (2013.01); *H05B 6/12* (2013.01); *A23V 2002/00* (2013.01); *H05B 6/1209* (2013.01)

(58) Field of Classification Search
CPC ......... H05B 6/108; H05B 6/12; H05B 6/1209
USPC ........... 99/451, DIG. 14, 358, 359; 219/635, 219/624, 630, 660, 674, 628, 627, 649
See application file for complete search history.

(56) References Cited

U.S. PATENT DOCUMENTS 694,131 A    2/1902 Butkus
2,439,517 A    4/1948 Johnson
(Continued)

FOREIGN PATENT DOCUMENTS

CN    201844538    5/2011
EP    0099159    1/1984
(Continued)

OTHER PUBLICATIONS

U.S. Appl. No. 13/834,649, filed Mar. 15, 2013, Gurka et al.
(Continued)

*Primary Examiner* — Reginald Alexander
(74) *Attorney, Agent, or Firm* — Reinhart Boerner Van Deuren S.C.

(57) ABSTRACT

Induction heating systems for metal food cans configured to deliver sufficient heat into the can to sterilize the food within the can are provided. The heating system includes an induction coil and a control system. The control system is configured to monitor and control heating of sealed food cans during induction heating and to control and/or confirm various aspects of can heating during induction heating.

14 Claims, 11 Drawing Sheets

Related U.S. Application Data

(60) Provisional application No. 61/983,935, filed on Apr. 24, 2014.

(51) Int. Cl.
*H05B 6/10* (2006.01)
*A23L 3/04* (2006.01)
*B65B 55/06* (2006.01)
*B65D 81/34* (2006.01)
*H05B 6/12* (2006.01)

(56) References Cited

U.S. PATENT DOCUMENTS

| | | | |
|---|---|---|---|
| 2,752,472 A | 6/1956 | Emerson | |
| 2,945,935 A | 7/1960 | Messner et al. | |
| 3,071,478 A | 1/1963 | Cheftel | |
| 3,694,609 A | 9/1972 | Kennedy | |
| 3,723,212 A | 3/1973 | Casper | |
| 3,961,150 A | 6/1976 | Lewis et al. | |
| 4,048,473 A | 9/1977 | Burkhart | |
| 4,156,741 A | 5/1979 | Beauvais et al. | |
| 4,288,673 A | 9/1981 | Ishibashi | |
| 4,340,801 A | 7/1982 | Ishibashi | |
| 4,399,925 A | 8/1983 | Fundom | |
| 4,415,324 A | 11/1983 | Henckel | |
| 4,539,456 A | 9/1985 | Mohr | |
| 4,612,199 A | 9/1986 | Miyahara | |
| 4,696,580 A | 9/1987 | Kameda | |
| 4,739,140 A | 4/1988 | Reznik | |
| 4,817,510 A | 4/1989 | Kowalics | |
| 4,828,692 A | 5/1989 | Peranio | |
| 4,948,499 A | 8/1990 | Peranio | |
| 4,971,819 A | 11/1990 | Miyahara | |
| 4,990,347 A | 2/1991 | Rasmussen et al. | |
| 5,064,614 A | 11/1991 | Reiss et al. | |
| 5,114,725 A | 5/1992 | Leake et al. | |
| 5,142,115 A * | 8/1992 | Weidman | F24H 1/105 |
| | | | 219/618 |
| 5,143,204 A | 9/1992 | Owen | |
| 5,144,108 A | 9/1992 | Passarotto | |
| 5,182,981 A | 2/1993 | Wilcox | |
| 5,347,107 A | 9/1994 | Iguchi | |
| 5,386,102 A | 1/1995 | Takikawa | |
| 5,422,130 A | 6/1995 | Fox et al. | |
| 5,474,227 A | 12/1995 | Krengel | |
| 5,512,733 A | 4/1996 | Takikawa | |
| 5,529,703 A | 6/1996 | Sprenger et al. | |
| 5,690,851 A * | 11/1997 | Yoshioka | H05B 6/105 |
| | | | 219/624 |
| 5,706,721 A | 1/1998 | Homes | |
| 5,766,002 A | 6/1998 | Silvestrini | |
| 5,782,339 A | 7/1998 | Drewitz | |
| 5,804,237 A | 9/1998 | Diamond | |
| 5,821,504 A | 10/1998 | Sprenger et al. | |
| 5,847,370 A | 12/1998 | Sluka et al. | |
| 5,869,810 A | 2/1999 | Reynolds et al. | |
| 5,965,086 A | 10/1999 | Rose et al. | |
| 6,177,662 B1 | 1/2001 | Rutledge | |
| 6,295,449 B1 | 9/2001 | Westerlage | |
| 6,320,169 B1 | 11/2001 | Clothier | |
| 6,463,272 B1 | 10/2002 | Wallace | |
| 6,698,923 B2 | 3/2004 | Bedetti | |
| 6,721,546 B1 | 4/2004 | Compton | |
| 6,725,630 B2 | 4/2004 | Rea | |
| 6,786,672 B2 | 9/2004 | Ledingham | |
| 6,959,640 B2 * | 11/2005 | Flick | A23L 2/50 |
| | | | 210/695 |
| 6,967,315 B2 | 11/2005 | Centanni | |
| 7,323,666 B2 | 1/2008 | Spohn | |
| 7,432,479 B2 * | 10/2008 | Avendano | G07F 9/105 |
| | | | 219/627 |
| 7,432,480 B2 | 10/2008 | Wilson | |
| 7,497,352 B2 | 3/2009 | Segiet | |
| 7,605,349 B2 | 10/2009 | Gaynor | |
| 7,820,947 B2 | 10/2010 | Gaynor | |
| 7,976,887 B2 | 7/2011 | Inoue et al. | |
| 8,122,815 B2 | 2/2012 | Wolfe | |
| 8,141,741 B2 | 3/2012 | Metzger et al. | |
| 8,159,340 B2 | 4/2012 | Peters | |
| 8,602,248 B2 | 12/2013 | Mathieu | |
| 8,707,862 B1 | 4/2014 | Oliver | |
| 8,978,922 B2 | 3/2015 | Baker et al. | |
| 9,060,390 B2 | 6/2015 | Rudnev | |
| 9,382,034 B2 | 7/2016 | Baker et al. | |
| 2002/0110178 A1 | 8/2002 | Puranen | |
| 2002/0124737 A1 | 9/2002 | Bedetti | |
| 2003/0015523 A1 | 1/2003 | Nishinomiya | |
| 2003/0197007 A1 | 10/2003 | Kim | |
| 2004/0084443 A1 | 5/2004 | Ulrich | |
| 2005/0126124 A1 | 6/2005 | Munzer et al. | |
| 2005/0236385 A1 | 10/2005 | Kingdon | |
| 2006/0186127 A1 | 8/2006 | Gopalaswamy et al. | |
| 2006/0219705 A1 | 10/2006 | Beier | |
| 2008/0029505 A1 | 2/2008 | Rosenbloom et al. | |
| 2008/0083730 A1 | 4/2008 | Dolgov | |
| 2008/0257168 A1 | 10/2008 | Wolfe | |
| 2009/0118126 A1 | 5/2009 | Burke | |
| 2009/0173733 A1 | 7/2009 | Bogdan | |
| 2009/0175315 A1 | 7/2009 | Schwegman | |
| 2010/0172795 A1 | 7/2010 | Lothar | |
| 2011/0011852 A1 | 1/2011 | Mezquida Gisbert et al. | |
| 2011/0083810 A1 | 4/2011 | Lin et al. | |
| 2011/0114634 A1 | 5/2011 | Nevarez | |
| 2011/0123690 A1 | 5/2011 | Zavadtsev Koulik et al. | |
| 2011/0220249 A1 | 9/2011 | Bogicevic et al. | |
| 2011/0240633 A1 | 10/2011 | Rudnev | |
| 2011/0259878 A1 | 10/2011 | Sadler | |
| 2012/0063799 A1 | 3/2012 | Ueno | |
| 2012/0205363 A1 | 8/2012 | Takatomi et al. | |
| 2013/0272820 A1 | 10/2013 | Price et al. | |
| 2013/0306661 A1 | 11/2013 | Baker | |
| 2014/0263286 A1 | 9/2014 | Widitora | |
| 2014/0263287 A1 | 9/2014 | Widitora et al. | |
| 2014/0335248 A1 | 11/2014 | Winstanley et al. | |
| 2014/0348987 A1 | 11/2014 | Cheng | |
| 2015/0264752 A1 | 9/2015 | Rosenbloom | |

FOREIGN PATENT DOCUMENTS

| | | |
|---|---|---|
| EP | 0895719 | 10/1999 |
| EP | 2458933 | 5/2012 |
| EP | 2747587 | 7/2014 |
| EP | 2972163 | 1/2016 |
| EP | 2974527 | 1/2016 |
| FR | 2493682 | 5/1982 |
| GB | 1441701 | 7/1976 |
| GB | 2384478 | 7/2003 |
| JP | 10-167225 | 6/1998 |
| JP | 10-218130 | 8/1998 |
| JP | 2002-199986 | 7/2002 |
| JP | 2006-271524 | 10/2006 |
| JP | 2012-038621 | 2/2012 |
| JP | 2012-130275 | 7/2012 |
| WO | WO 95/34469 | 12/1995 |
| WO | WO 2012/153394 | 11/2012 |
| WO | WO 2013/006718 | 1/2013 |
| WO | WO 2013/009624 | 1/2013 |
| WO | WO 2013/027067 | 2/2013 |
| WO | WO 2013/075877 | 5/2013 |
| WO | WO 2014/143102 | 9/2014 |
| WO | WO 2014/143103 | 9/2014 |
| WO | WO2014/143121 | 9/2014 |
| WO | WO 2015/164174 | 10/2015 |

OTHER PUBLICATIONS

U.S. Appl. No. 13/834,836, filed Mar. 15, 2013, Brewer et al.
International Search Report and Written Opinion regarding PCT/US2015/026136, dated Jun. 29, 2015, 6 pages.
Food Production Daily, Joe Whitworth, website newsletter showing article titled "Crown patent to improve canned food processing," dated Mar. 5, 2013, accessed May 31, 2013 at http://mobile.

(56) References Cited

OTHER PUBLICATIONS foodproductiondaily.com/Processing/Crown-patent-to-improve-canned-food-processing/?utm_source=newsletter_daily&utm_medium=email&utm_campaign=Newsletter%2BDaily&c=tAAvBv%2FdlUiJjzs9nzczTA%/3D%3D#.UTZIEPq9LCQ, 3 pages.

International Search Report and Written Opinion for International Application No. PCT/US2013/042271 dated Dec. 9, 2013, 10 pages.

International Search Report and Written Opinion for International Application No. PCT/US2013/042218, dated Dec. 30, 2013, 14 pages.

\* cited by examiner

FOOD CONTAINER INDUCTION HEATING SYSTEM HAVING POWER BASED MICROBIAL LETHALITY MONITORING

CROSS-REFERENCE TO RELATED PATENT APPLICATION

This application claims priority to and the benefit of PCT Application No. PCT/US15/26136, filed Apr. 16, 2015, which claims priority to U.S. Provisional Patent Application No. 61/983,935, filed Apr. 24, 2014, which are incorporated herein by reference in their entirety.

BACKGROUND OF THE INVENTION

The present invention relates generally to the field of systems and methods for heating food containers. The present invention relates specifically to systems and methods for using induction heating to heat, sterilize and/or cook food in metal or metallic containers. Conventional commercial production of food packaged in metal containers may involve filling a metal can with food, hermetically sealing the can, and heating the can with the food inside to sterilize the food within the can. During one conventional heating procedure, filled, sealed cans are treated within a steam heated, pressurized chamber (e.g., a pressurized retort) to heat the cans to the desired sterilization temperature using steam and to maintain the temperature for the desired period of time. The pressurized chamber is filled with super-heated steam which in turn provides the energy to heat the can. In other commercial production processes, sealed and filled food may be heated in systems that do not rely on super-heated steam

SUMMARY OF THE INVENTION

Various embodiments of the invention relate to induction heating systems for metal food cans configured to deliver sufficient heat into the can to substantially sterilize or commercially sterilize the food within the can.

One embodiment of the invention relates to an induction heating system configured to heat and substantially sterilize a metal food can using induction heating. The system includes an induction heating coil generating an alternating magnetic field. The system includes a hermetically sealed metal can positioned within the magnetic field generated by the induction coil, and the sealed metal can includes a food product within the sealed metal can. The magnetic field causes resistive heating of the metal of the sealed metal can. The system includes a temperature sensing element located within the hermetically sealed can configured to detect the temperature of the food product during heating. The system includes a power monitoring device configured to detect the power delivered to the induction heating coil. The system includes a control system in communication with the temperature sensing element and the power monitoring device. The control system is configured to store data indicative of the temperature of the food product detected by the temperature sensing element and to store data indicative of the power delivered to the induction heating coil detected by the power monitoring device. The control system is configured to determine a relationship between power delivered to the induction heating coil and the temperature of the food product within the sealed metal can.

Another embodiment of the invention relates to an induction heating system configured to heat a metal food can. The system includes an induction heating coil generating an alternating magnetic field. The system includes a hermetically sealed metal can positioned within the magnetic field generated by the induction coil, the sealed metal can including a food product within the sealed metal can. The magnetic field causing resistive heating of the metal of the sealed metal can. The system includes an electrical power supply delivering power to the induction heating coil. The system includes a power monitoring device electrically coupled to the induction heating coil configured to generate a signal indicative of the power delivered to the induction heating coil by the electrical power supply. The system includes a control system in communication with the power monitoring device. The control system is configured to store power data based upon the signal indicative of the power delivered to the induction heating coil by the electrical power supply generated by the power monitoring device. The control system is configured to determine an amount of energy delivered to the food product within the sealed metal can based upon the power data and based upon efficiency data indicative of the efficiency of energy transfer from the induction coil to the food product within the sealed metal can.

Another embodiment of the invention relates to an induction heating system configured to heat and substantially sterilize a metal food can using induction heating. The system includes an induction heating coil generating an alternating magnetic field. The system includes a hermetically sealed metal can positioned within the magnetic field generated by the induction coil, and the sealed metal can includes a food product within the sealed metal can. The magnetic field causes resistive heating of the metal of the sealed metal can. The system includes a first temperature sensor located within the hermetically sealed can configured to generate a signal indicative of the temperature of the food product within the can while the can is within the induction coil. The system includes a second temperature sensor configured to generate a signal indicative of the temperature of a surface of the can. The system includes a control system in communication with the first temperature sensor and the second temperature sensor. The control system stores internal temperature data based upon the signal from the first temperature sensor and stores surface temperature data based upon the signal from the second temperature sensor. The control system is configured to determine a correlation between the temperature of the food product within the can and the temperature of the surface of the can based upon the surface temperature data and the internal temperature data.

Another embodiment of the invention relates to a food can heating system configured to heat and substantially sterilize a plurality of filled and hermetically seal food cans. The system includes an induction heating coil configured to generate an alternating magnetic field causing resistive heating of the metallic material of the food can. The system includes a can moving device configured to move cans into the induction heating coil prior to induction heating, to move cans while being heated by the induction heating coil and to move cans out of the induction heating coil after induction heating. The system includes a power supply configured to supply alternating current to the induction heating coil. The system includes a power monitoring system coupled to the induction heating coil and configured to measure electrical power delivered to the induction heating coil during a heating cycle. The system includes a can monitoring device configured to determine the amount of time each can spends within the induction heating coil. The system includes a control system in communication with the power monitoring system and the can monitoring device. The control system configured to determine the amount of energy received by each food can from the induction heating coil based upon the power delivered to the induction heating coil and based upon the determined time of the food can within the induction coil.

Another embodiment of the invention relates to a method of using induction heating to heat and substantially sterilize a metal food can using induction heating. The method including placing a hermetically sealed metal can containing a food product within an induction heating coil. The method including generating an alternating magnetic field within the heating coil causing resistive heating of the metal of the sealed metal can. The method including detecting the temperature of the food product within the metal food can during induction heating. The method including monitoring the electrical power used by the induction heating coil during heating of the metal can. The method including determining an amount of energy received by the food product within the can based upon the electrical power used by the induction heating coil. The method including determining the amount energy that must be received by the food product within the can such that the temperature of the food product remains above a predetermined temperature threshold for a predetermined amount of time.

Another embodiment of the invention relates to a method of using induction heating to heat and substantially sterilize a metal food can. The method including placing a hermetically sealed metal can containing a food product within an induction heating coil. The method including generating an alternating magnetic field within the heating coil causing resistive heating of the metal of the sealed metal can. The method including detecting the temperature of the food product within the metal food can during induction heating via a first temperature sensor located within the metal can. The method including detecting the temperature of a surface of the metal food can during induction heating via a second temperature sensor located outside of the metal can. The method including determining a relationship between the temperature of the food product within the metal food can and the temperature of the surface of the metal food can during induction heating.

Another embodiment of the invention relates to a method of using induction heating to heat and substantially sterilize a metal food can. The method includes placing a hermetically sealed metal can containing a food product within an induction heating coil. The method includes generating an alternating magnetic field within the heating coil causing resistive heating of the metal of the sealed metal can. The method includes monitoring the electrical power used by the induction heating coil during heating of the metal can. The method includes determining data indicative of the efficiency of energy transfer from the induction coil to the food product within the food can. The method includes determining the amount of energy received by the food product within the can based upon the electrical power used by the induction heating coil and based upon the determined data indicative of the efficiency of energy transfer from the induction coil to the food product within the food can.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
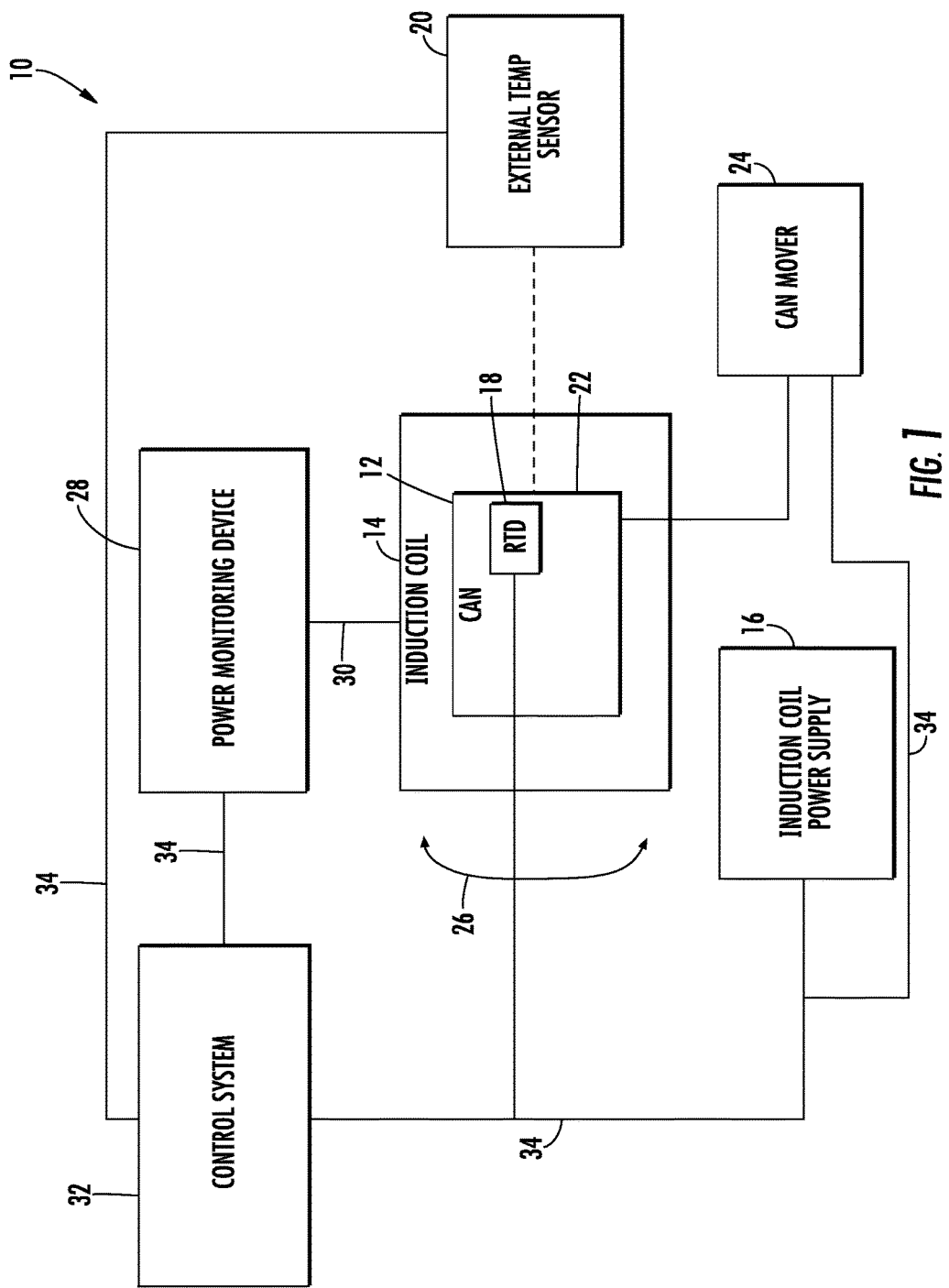
FIG. 1 is a diagram of a can induction heating system according to an exemplary embodiment.

Referring generally to the figures, various embodiments of an induction heating system for metal food cans configured to deliver sufficient heat into the can to substantially sterilize the food within the can are shown (e.g., commercially sterile, render can shelf-stable and/or kill sufficient number of microbes such that significant microbe growth or germination does not occur at temperatures less than 50 degrees C.). In various embodiments discussed herein, the power and/or energy used by the induction heating system is monitored and/or controlled to ensure sterilization of the metal food cans as the cans proceed through the induction heating system. In various other embodiments, systems and methods for developing induction heating protocols and for confirming and validating the microbial lethality of the protocols are described. In various embodiments, such systems and methods utilize monitoring of power or energy used by the induction heating system to confirm/ensure/control microbial lethality.

Typically, the food containers discussed herein are filled and sealed metal food cans. Generally, the systems disclosed herein include an induction coil and at least one metal or metallic can located within the induction coil. The induction coil generates an alternating magnetic field which induces a corresponding current (e.g., eddy currents) within the metal of the can (e.g., a steel can sidewall and a steel can end). The induced current results in resistive heating of the metal portions of the can body, and the heat generated is then transferred (e.g., by conduction and/or convection) throughout the container to heat the contents of the container to the desired temperature.

In many metal can food processing systems, the food within the can must be heated sufficiently such that microbes within the can are killed. Heating the contents of metal can to sufficiently high temperature for a sufficiently long length of time is known to sterilize the contents of metal food can rendering them shelf-stable for long periods of time. As will be understood, the higher the temperature of the can contents the shorter the length of heating time used to sterilize the can contents, and if a lower temperature is used a longer length of heating time is used to sterilize the can contents.

In various embodiments, the systems and methods discussed herein monitor power and or/energy used by an induction coil to monitor, determine or confirm can sterilization rather than utilizing direct measurement of content temperature alone. In various embodiments, the systems and methods discussed herein also provide for confirmation and validation of can contents sterility based on the monitoring of induction coil power and/or energy delivered to the can. In various embodiments, the systems and methods discussed herein provide for correlating induction coil power and/or energy delivered to the can to currently known sterilization parameters (e.g., contents temperature, time and/or sterilization value). In addition, in various embodiments, a can sterilization system is provided that includes sensing elements and control elements to track each can that traverses the system and monitor induction coil power and/or the amount of energy delivered to the contents of each can via the induction coil. In some such embodiments, can content sterility is confirmed based upon comparison of the determined amount of energy delivered to the contents of the can via the induction coil to a known energy threshold that indicates that the temperature of the food product within the can has remained above a predetermined temperature threshold for a predetermined amount of time. For example, in one embodiment, the predetermined temperature threshold is 250 degrees Celsius and the predetermined amount of time at that temperature is five minutes. In another embodiment, the predetermined temperature threshold is 268 degrees Celsius and the predetermined amount of time at that temperature is 30 seconds. In another embodiment, the predetermined temperature threshold is 286 degrees Celsius and the predetermined amount of time at that temperature is 3 seconds.

In various embodiments, the systems and methods discussed herein are configured to monitor power used by an induction coil of the can heating system and monitor the internal temperature of the contents of the can. In such embodiments, the systems and methods then determine a relationship between the monitored power and the internal temperature of the contents of the can. As will be understood, this determined relation is based upon the thermodynamics and efficiency of the induction system used. In various embodiments, the systems and methods discussed herein are configured to monitor power used by the induction coil and to determine an amount of energy delivered to the food product within the sealed metal can based upon the monitored power and based upon efficiency data indicative of the efficiency of energy transfer from the induction coil to the food product within the sealed metal can. In various embodiments, the efficiency data includes data related to one or more aspects of the heating system that may relate to the efficiency of energy transfer from the induction heating coil to the contents of the can. For example, such aspects may include the intensity of the magnetic field along the path of the induction coil, the specific heat, thermal transport properties of the of the can contents, the material and configuration of the metal can, etc. In various embodiments, these determined relationships between power used by the induction heating coil and energy received by the food within the cans may be used within a system that monitors power used by an induction coil to confirm that the contents of the can have reached a sufficiently high sterilization time and temperature.

In various embodiments, the systems and methods discussed herein are configured to monitor both an internal temperature of contents within the can and a temperature of a surface of the can. In such embodiments, a relationship between the temperature of the food product within the can and the temperature of the surface of the can is determined. This known relationship may be used as part of a system that measures can surface temperature to confirm that the contents of the can have reached a sufficiently high sterilization time and temperature.

Referring to FIG. 1 through FIG. 5, an induction heating system 10 is shown. In general, system 10 is an induction heating system that is configured to use induction heating to heat and sterilize a sealed metal can, shown as can 12. Can 12 is a hermetically sealed metal can that includes a food product within the can. In various embodiments, as discussed below, system 10 is configured to generate various data and/or heating protocols to confirm that induction heating system 10 has sterilized the contents of can 12.

System 10 includes an induction heating coil 14. In operation can 12 is located within induction heating coil 14, and induction heating coil 14 generates an alternating magnetic field that causes resistive heating of the metal material of can 12 (in particular the metal material of the sidewall of can 12). System 10 includes an induction coil power supply 16 that generally supplies electrical power to induction coil 14 to generate the alternating magnetic field. In one embodiment, power supply 16 is configured to supply both AC and DC power to coil 14 as may be selected. In another embodiment, power supply 16 is an AC power supply, and a separate DC power supply is used to power the induction coil during magnetic field intensity mapping.

System 10 includes a first temperature sensing element, shown as resistance temperature detector (RTD) 18, located within the contents chamber of can 12. RTD 18 is a sensor configured to generate a signal indicative of the temperature of the contents of can 12. System 10 also includes a second temperature sensing element, shown as external temperature sensor 20, that is positioned and configured to detect the temperature of a portion of the outer surface of can 12. In the specific embodiment shown in FIG. 1, external temperature sensor 20 is an infrared detector or camera that measures the temperature of an end wall 22 of can 12. In one embodiment shown in FIG. 1, RTD 18 is located between the axial center point of can 12 and end wall 22 such that RTD 18 resides in the coldest portion of the interior of can 12.

System 10 includes a can moving device, shown as can mover 24, that engages and moves can 12 within induction coil 14. In various embodiments, can mover 24 is an actuation device configured to spin or rotate can 12 about its longitudinal axis generally in the direction shown by arrow 26. In various embodiments, can mover 24 is configured to spin can 12 in both the clockwise and counterclockwise directions, and in some embodiments, can mover 24 is also configured to agitate and/or oscillate can 12.

System 10 includes a power monitoring device 28 electrically coupled to induction coil 14. In general, power monitoring device 28 is a device configured to monitor, detect and/or generate a signal indicative of the amount of electrical power drawn or used by induction coil 14 during induction heating of can 12. In one embodiment, power monitoring device 28 is a watt meter. In another embodiment, power monitoring device 28 includes both an amp meter and a voltage meter, and in one such embodiment, the volt meter is placed across the poles of the coil and the amp meter is a torodial transformer placed around the induction coil. In another embodiment, power monitoring device 28 monitors magnetic field strength throughout the coil, and control system 32 calculates or derives coil power from the measured magnetic field. As shown in FIG. 1, power monitoring device 28 is configured to provide a direct reading of power used by coil 14 by minimizing or reducing the amount of power in the power reading that is the result of other components of the circuit. In one such embodiment, power monitoring device 28 is electrically coupled via electrical coupling 30 to coil 14 to decrease, minimize or eliminate the number of electronic devices drawing power between the power monitoring device 28 and coil 14. This arrangement helps to ensure that the power data generated by power monitoring device 28 includes only or primarily data related to power used by the induction coil.

System 10 includes a control system 32 operatively coupled via communication links 34 to other components of system 10 including power supply 16, RTD 18, external temperature sensor 20, can mover 24 and power monitoring device 28. In general, control system 32 is any suitable processing, logic or computer system configured to provide the various monitoring, control and computational functionality discussed herein. Communication links 34 are any suitable communication links (e.g., hardwired communication links, wireless communication links, etc.) to communicate data from the devices of system 10 to control system 32 to provide the functionality discussed herein.

In one embodiment, control system 32 is configured determine a relationship between power used by induction heating coil 14 during heating of can 12 and the internal temperature of the contents of can 12. In such embodiments, control system 32 is configured to receive and store data indicative of the power delivered to the induction coil from power monitoring system 28 at various time points (e.g., every second, every millisecond, etc.) during heating of can 12. In one embodiment, power monitoring system 28 is a watt meter that measures power used by induction coil 14, and thus the data indicative of power used by control system 32 is a direct power reading. In other embodiments, data indicative of power from power monitoring system 28 is current and voltage data from which power is calculated. In addition, control system 32 is configured to receive and store data indicative of the temperature of the food product within can 12 that is detected by RTD 18 at various time points (e.g., every second, every millisecond, etc.) during heating of can 12.

In such embodiments, control system 32 is configured to correlate, compare or analyze the data indicative of power and the corresponding, time matched temperature data to compute or determine a relationship between the power delivered to induction coil 14 and the temperature of the can contents. In a specific embodiment, the data indicative of power utilized by control system 32 is the total amount of energy (i.e., the integral of power) delivered to induction coil 14 during the induction heating cycle. In this embodiment, control system 32 is configured to determine the relationship between the total amount of energy delivered to induction coil 14 during the induction heating cycle and a temperature profile (i.e., the temperature of the contents of the can at various time points during and after the induction heating cycle as shown for example in FIG. 2) of the contents within can 12.

In another embodiment, control system 32 is configured to determine the amount of energy delivered into the food product within can 12 based on the power data received from power monitoring system 28. In such embodiments, control system 32 is configured to determine a relationship between the amount of energy delivered in to the contents of can 12 and the temperature of the contents of can 12. In a specific embodiment, control system 32 is configured to determine a relationship between the amount of energy delivered in to the contents of can 12 and the temperature profile of contents of can 12 both during and after induction heating.

In various embodiments, in addition to utilizing the power data received from power monitoring system 28, control system 32 is also configured to determine the amount of energy delivered into the food product within can 12 based on efficiency data indicative of the efficiency of energy transfer from induction coil 14 to the metal of the can 12. In one embodiment, the efficiency data includes data indicative of the magnetic field intensity of the magnetic field generated by indication coil 14. In various embodiments (as discussed and shown in FIG. 8 below) the magnetic field intensity data may include intensity data at multiple points along a path through an induction coil. In additional embodiments, the efficiency data may include data related to the type and content of metal within can 12, the thickness of the metal of can 12, the size and shape of the metal portions of can 12, etc.

In one embodiment, control system 32 is configured to determine an efficiency factor or coefficient that is indicative of the portion of energy drawn by induction heating coil 14 in generating the alternating magnetic field that is successfully delivered into contents within can 12. In one embodiment, the efficiency factor is an empirically determined coefficient less than 1 that is determined by measuring power and energy delivered to coil 14 via power monitoring device 28, and by calculating the amount of energy actually received by the contents of can 12 based on a measured temperature profile generated by RTD 18. The ratio of the amount of energy actually received by the contents of can 12 to the amount of energy delivered to coil 14 describes the efficiency of energy transfer to the contents of can 12. As explained in more detail below, this efficiency factor may then be utilized by control system 32 during induction heating to confirm that a desired amount of energy has been delivered into can 12 based upon the monitoring of power/energy drawn by coil 14 as monitored by power monitoring device 28.

In various embodiments, control system 32 is configured to utilize one more or more of the determined relationships discussed herein to determine the operation parameters of induction coil 14 needed to sterilize the contents of can 12. In one such embodiment, control system 32 is configured control induction coil 14 to ensure that enough energy is delivered into can 12 to sterilize the contents of can 12. In this embodiment, control system 32 receives power data from power monitoring device 28 and integrates the power data over the amount of time that can 12 is within the magnetic field of coil 14 adjusted based on the determined efficiency factor to determine the amount of energy received by the contents of can 12. According to one embodiment, the general control algorithm executed by control system 32 in determining energy received by the contents of can 12 is shown by equation 80 in FIG. 8. In one such embodiment, when control system 32 determines that the desired amount of energy has been delivered to can 12, control system 32 turns off induction coil 14. In another embodiment, the induction heating system includes a first induction coil and a second induction coil, and in one such embodiment, control system 32 determines the amount of energy that has been delivered to can 12 by the first induction coil, and then controls the supply of power to the second induction coil based on the amount of energy that has been delivered to can 12 by the first induction coil to ensure that the desired total amount of energy has been delivered to the can to achieve substantial sterilization.

In various embodiments, the desired amount of energy or energy threshold is determined as the amount of energy that must be input into the contents of can 12 to raise the temperature of the contents of the can above a predetermined temperature threshold for a predetermined amount of time sufficient to sterilize the contents of can 12. In various embodiments, sterilization relationship of internal temperature and time at temperature for sealed food cans is empirically determined and is generally explained by the relationship: Lethality=$10^{((250-T)/z)}$, where T is the actual internal temperature (degrees F.) and z is a determined constant that reflects how killing power changes with temperature. For example, for low acid foods, the z value for *Clostridium botulinum* is 18.

Figure 2:
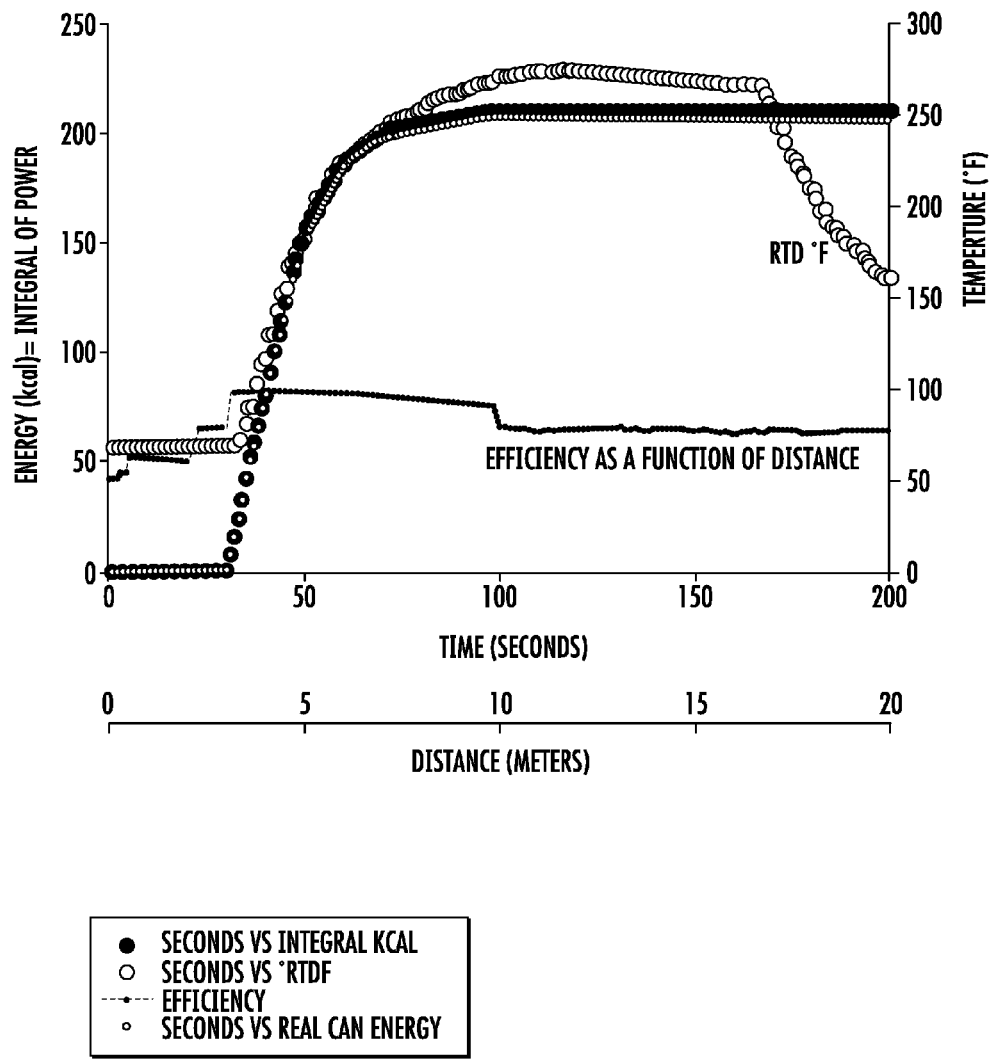
FIG. 2 is a graph demonstrating the correlation between induction coil power, energy and internal can temperature according to an exemplary embodiment.
Figure 7:
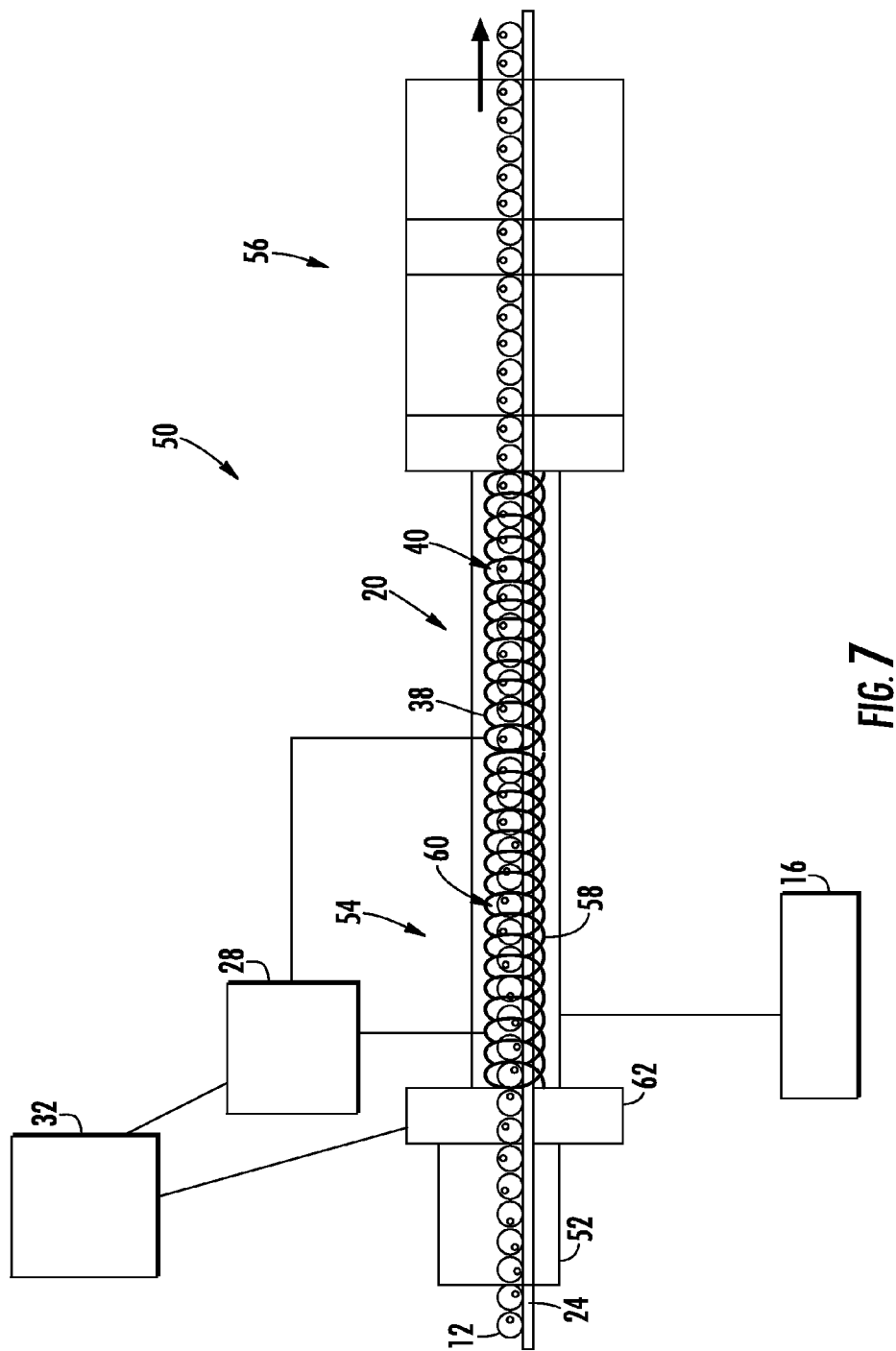
FIG. 7 is a diagram of a can induction heating system according to an exemplary embodiment.
Figure 8:
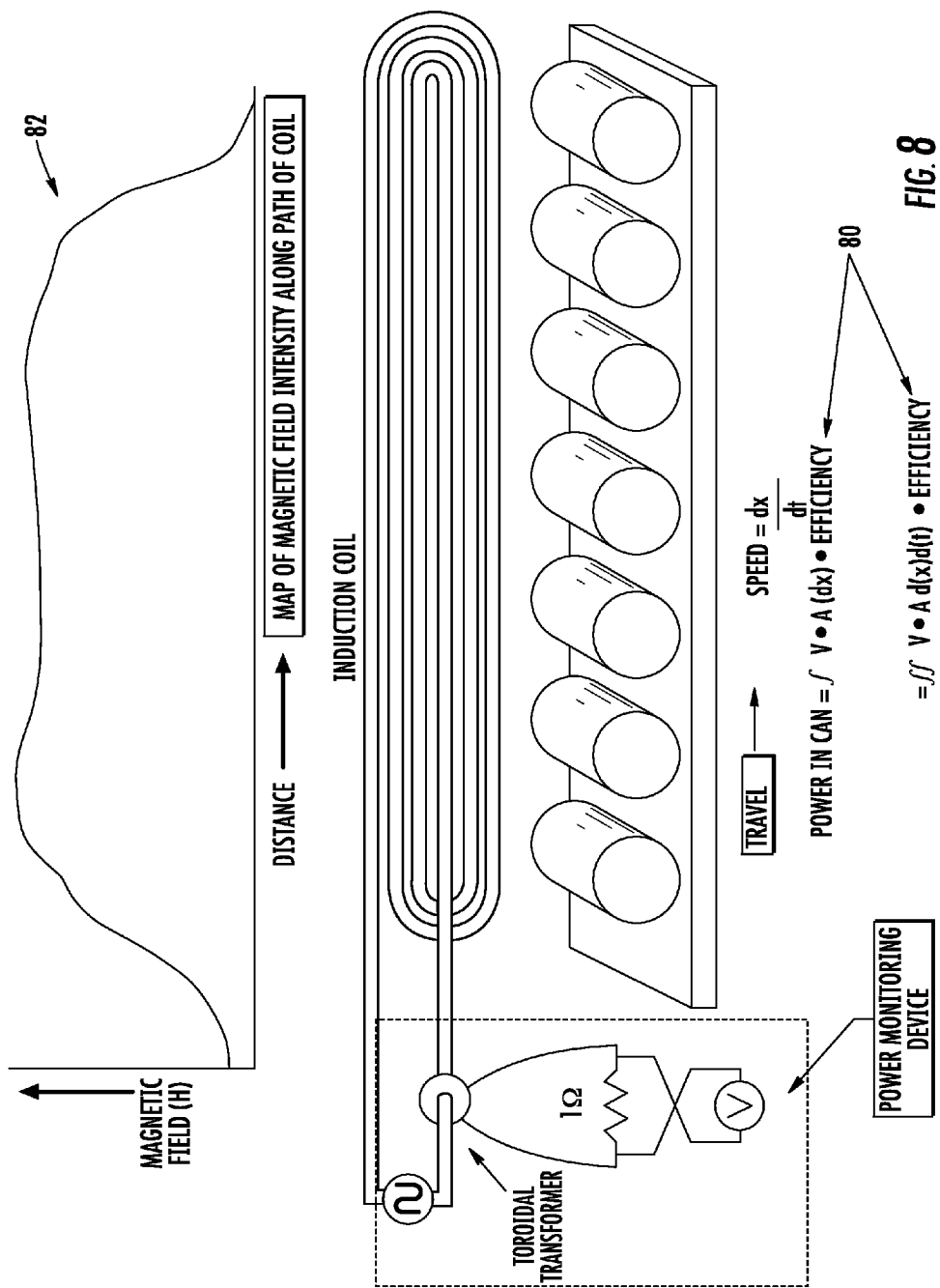
FIG. 8 is a schematic diagram illustrating an algorithm utilized by an induction heating control system according to an exemplary embodiment.

As an example, FIG. 2 shows data demonstrating an energy/sterilization determination that may be calculated by control system 32. The energy/sterilization determination of FIG. 2 shows the relationship between induction coil power, induction heating time (and/or induction coil distance in systems in which a can is moving through the coil, as shown in FIGS. 7 and 8), calculated induction coil energy, calculated can content energy as determined for a particular can size, material and can contents. For the energy/sterilization determination shown in FIG. 2, the can a 15 oz., 303×407 can dimension, made from steel tin plate, filled with green beans.

In another embodiment, control system 32 is configured to receive and store data from both RTD 18 and external temperature sensor 20. In one such embodiment, control system 32 is configured to determine a correlation between the temperature of the food product within the can as measured by RTD 18 and the temperature of the surface of the can as measured by external temperature sensor 20. In one embodiment, the relationship between internal temperature and external temperature may then utilized by control system 32 during induction heating to confirm that the contents of can 12 have reached the desired temperature for the desired amount of time based upon the monitoring of can surface temperature by external temperature sensor 20. In such embodiments, control system 32 is configured to determine internal can temperature based on the determined relationship between internal temperature and surface temperature and based upon measured surface temperature, and in some embodiments, control system 32 uses the determination based on surface temperature reading to confirm sterilization of the can without directly measuring internal temperature during induction heating. In one such embodiment, the surface temperature being read is the temperature of the center point of one of the end walls of the can and more specifically the center point of the lower end of the sidewall.

Referring to FIGS. 3-6, a schematic diagram of induction heating system 10 is shown according to an exemplary embodiment. As discussed above, induction heating system 10 is configured to measure the real-time temperature of the contents inside a can, shown as can 12, as can 12 is heated within induction coil 14 and to monitor and record the power usage of coil 14. As shown and discussed above, system 10 includes a power monitoring system 28 coupled to coil 14 and also includes a control system 32, that may include a computing device 426 in the embodiment of FIG. 3. In one embodiment, computing device is a programmable logic controller with an input device such as a touch screen, and in another embodiment, computing device 426 is a desktop, laptop or tablet computer. In general, system 10 is configured to provide the functionality described above regarding FIG. 1 and FIG. 2. In general, system 10 is configured to monitor power drawn by induction coil 14 as monitored by power monitoring device 28 and to determine the relationships between coil energy, energy delivered into can 12, internal can temperature and external can temperature as discussed above. In various embodiments, the relationships determined by system 10 are used to confirm that contents of can 12 have been heated to the sterilization temperature within induction coil 14. This data may then be used or submitted to obtain regulatory approval of an induction heating system for production of canned or packaged food products. The data may also be used to determine the various relationships between monitored induction coil power and sterilization time and temperature, and these determined relationships may be used to control induction heating in a system that monitors induction coil power but does not directly measure internal temperature of each can that is heated within the system.

Figure 3:
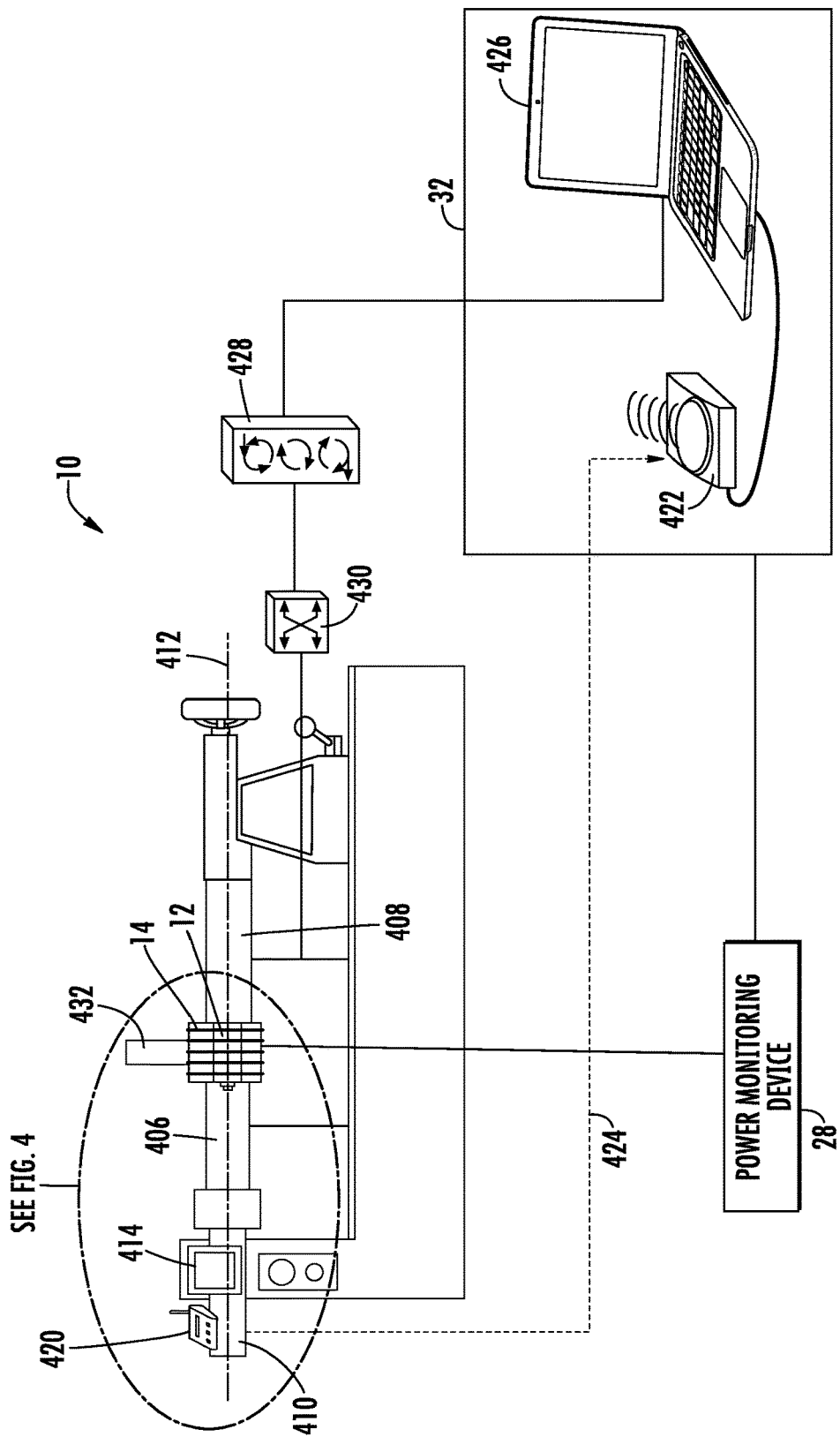
FIG. 3 is an induction heating system according to an exemplary embodiment.

FIG. 3 shows a can mover 24 according to an exemplary embodiment. Can mover includes two rotatable, restraint or support structures, shown as supports 406 and 408, and can 12 is supported between supports 406 and 408. Supports 406 and 408 provide rotation to can 12 while within induction coil 14 and also resist outward expansion of the ends of can 12.

A rotating spindle 410 is rigidly coupled to support 406 such that rotating spindle 410 and support 406 rotate together about axis 412. Thus, as support 406 spins to rotate can 12 within coil 14, as discussed above, spindle 410 also rotates. Spindle 410 extends through a rotational bracket 414 that rotationally supports both spindle 410 and support 406 such that spindle 410 and support 406 are permitted to rotate relative to bracket 414.

System 10 is configured to measure temperature within can 12 in real-time while both can 12 is within the energized induction coil 14 and while can 12 is spinning within coil 14. In the embodiment shown, system 10 includes a communication device, shown as wireless transmitter 420. In one embodiment, transmitter 420 is based on Xbee wireless module. Transmitter 420 is rigidly coupled to spindle 410 such that transmitter 420 rotates with spindle 410 and support 406 as can 12 is rotated.

Generally, transmitter 420 is coupled to a temperature sensing device, such as resistance temperature detector (RTD) 18 discussed above, configured to read the real-time temperature of the contents of can 12 during heating within coil 14, and transmitter 420 is configured to receive a signal indicative of the real-time temperature from the sensor. Transmitter 420 is configured to communicate data indicative of the real-time temperature to a receiver, shown as wireless receiver 422, via communication link 424. In one embodiment, a standard wireless communication protocol is used and in another embodiment, a proprietary wireless communication protocol is used. Wireless receiver 422 is coupled to a computing device 426. Computing device 426 is configured to store and process the received real-time temperature data. In one embodiment, computing device 426 includes one or more memory device to store the real-time temperature data received from temperature sensing device. In one embodiment, computing device 426 is configured to display a graph of the real-time temperature data versus time. In various embodiments, computing device 426 is configured to calculate the relationships between coil energy, energy delivered into can 12, internal can temperature and external can temperature as discussed above.

In the embodiment shown, computing device 426 is configured to communicate the real-time temperature data to controller 428. In one embodiment, controller 428 is in direct communication with wireless receiver 422 and is configured to receive and process data indicative of the real-time temperature directly from wireless receiver 422. Controller 428 is configured to control the operation of coil 14 and/or the rotational speed of can 12 based on the received data indicative of the real-time temperature within can 12. Controller 428 may be configured to control operation of coil 14 in a manner similar to controller 202, and controller 428 may be configured to control rotation of can 12 by controlling a motor that spins supports 406 and 408. Controller 428 may be configured to adjust the operation of coil 14 as discussed above regarding controller 202. In the embodiment shown, an electrically operated switch or optical isolator 430 is located between controller 428 and coil transformer 432 to supply the higher voltages and currents needed to control coil 14 based on a control algorithm to provide the functionality described herein.

Figure 4:
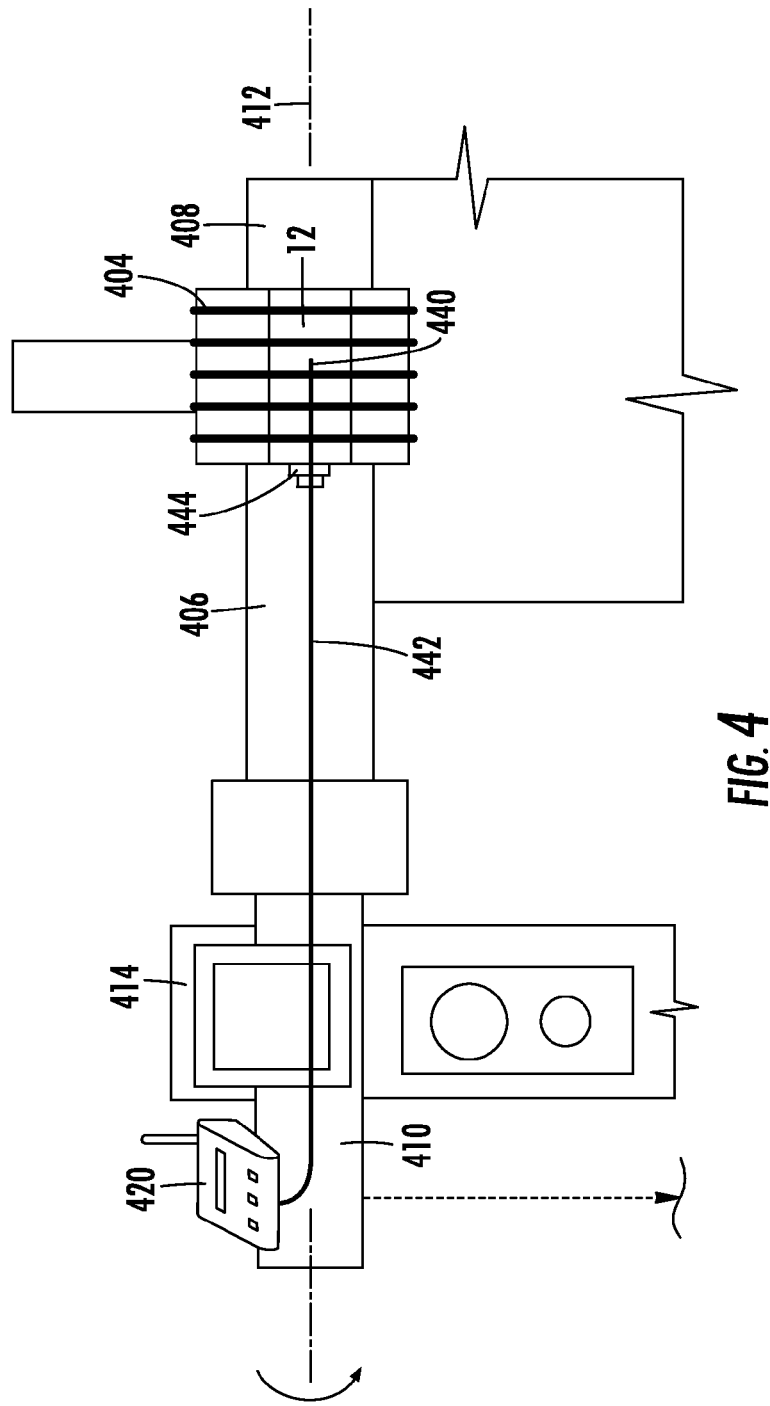
FIG. 4 is an enlarged view of a portion of the induction heating system of FIG. 3.

Referring to FIG. 4, a detailed view of the portion of system 10 including the temperature sensor is shown according to an exemplary embodiment. System 10 includes a temperature sensor, shown as RTD or probe 440. Probe 440 is substantially the same as RTD 18 except for the differences discussed herein. Probe 440 is located within can 12. As discussed in more detail below, probe 440 includes a temperature sensing element that is located in the geometric center of can 12. Probe 440 is coupled to a wire or lead 442 that transmits a signal indicative of the temperature of the contents of can 12 to wireless transmitter 420. As discussed above, wireless transmitter 420 then transmits the signal or data indicative of the sensed temperature to computing device 426 via receiver 422.

As shown, spindle 410 and support 406 both include hollow central channels within which lead 442 is located to extend from can 12 to wireless transmitter 420. Probe 440 and lead 442 are rigidly coupled to can 12 via fastener 444. Fastener 444 rigidly couples probe 440 and lead 442 to can 12 such that can 12, support 406, spindle 410, wireless transmitter 420, probe 440 and lead 442 all rotate at the same pace and/or together (same rotational phase and position).

Figure 5:
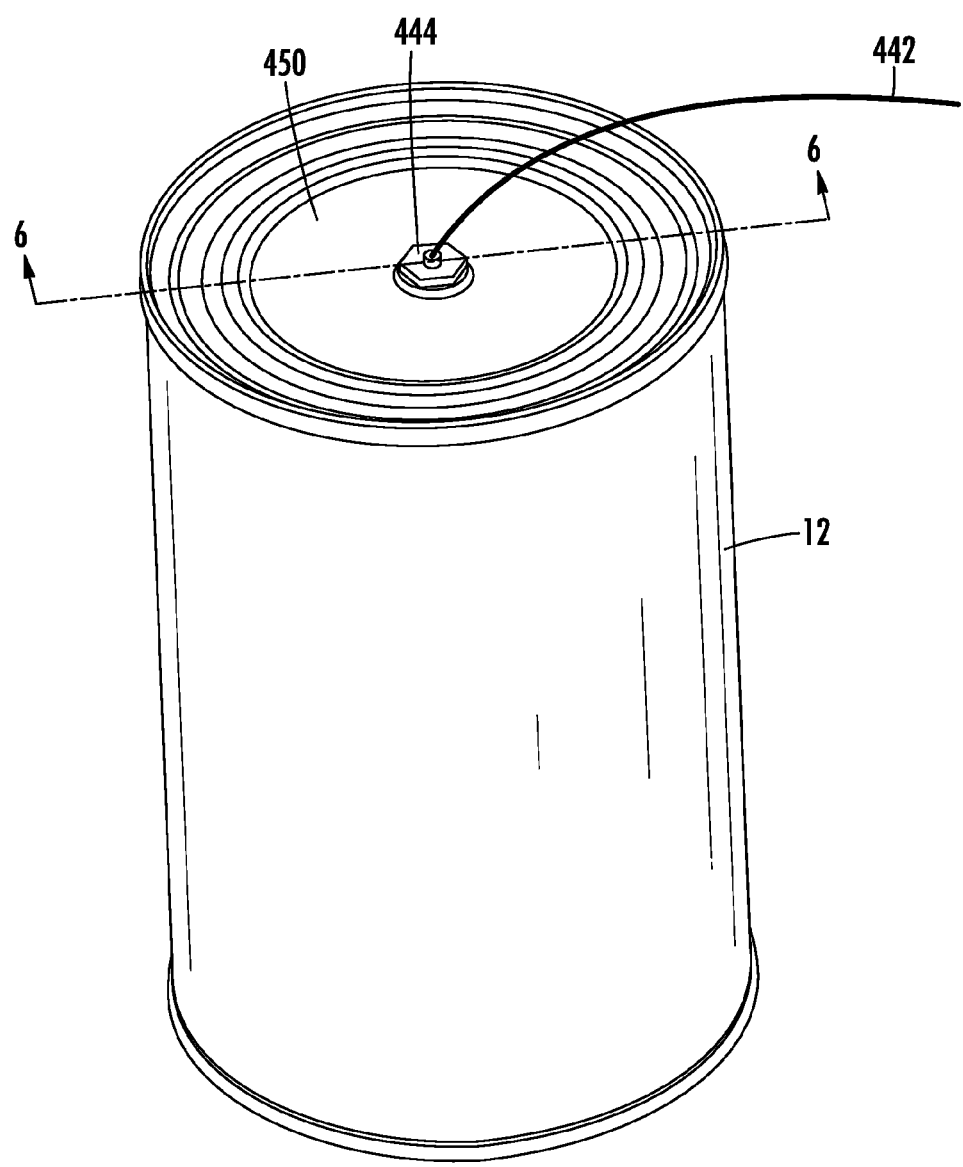
FIG. 5 is a can for use in the temperature detecting system of FIG. 3 according to an exemplary embodiment.
Figure 6:
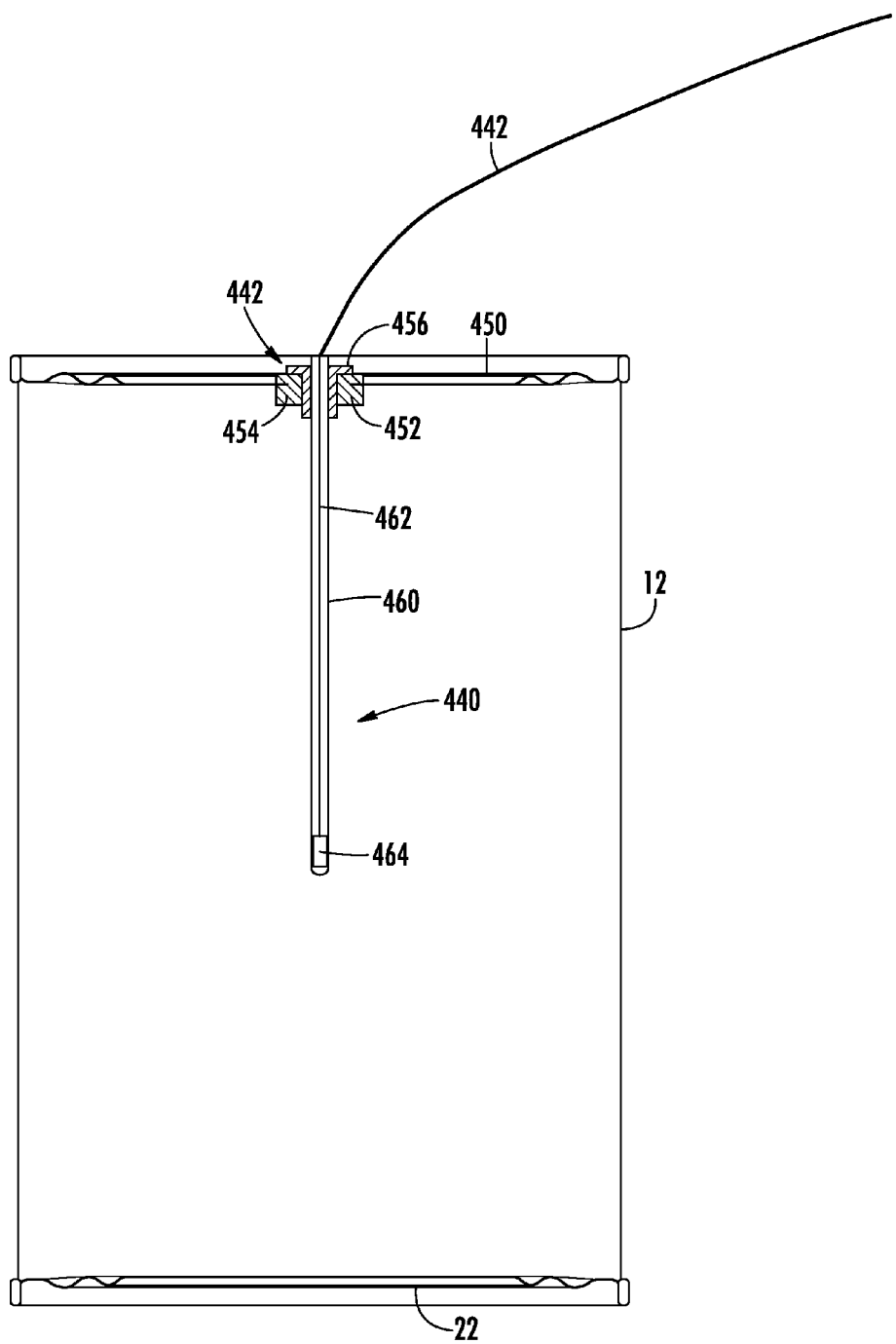
FIG. 6 is a cross-sectional view of the can of FIG. 5.

Referring to FIG. 5 and FIG. 6, can 12 with inserted temperature probe 440 is shown according to an exemplary embodiment. Fastener 444 extends through end wall 450 of can 12 and provides the rigid coupling and hermetic seal between probe 440, lead 442 and can 12. In the embodiment shown, fastener 444 includes a rivet 452 located through the center point of end wall 450. Fastener 444 provides a hermetic coupling to end wall 450 such that the contents of can 12 are not permitted to leak or escape around fastener 444 during heating within system 10.

Rivet 452 extends through a hole created through end wall 450 and includes a circumferential slot 454. As shown in FIG. 6, the inner edge of end wall 450 adjacent rivet 452 is received within circumferential slot 454, and circumferential slot 454 is clamped or crimped onto end wall 450 to rigidly couple rivet 452 to end wall 450. Rivet 452 includes a central through bore or channel defining a threaded inner surface. Fastener 444 also includes a bolt 456. Bolt 456 includes a threaded outer surface that threads into and rigidly engages bolt 456 to rivet 452. Bolt 456 includes a central through bore or channel, and temperature probe 440 extends through the central channel of bolt 456.

In one embodiment, rivet 452 and bolt 456 are formed from a non-electrically conductive material. In another embodiment, rivet 452 and bolt 456 are formed from a material with a low magnetic permeability when compared to the magnetic permeability of the material of can 12. In one such embodiment, rivet 452 and bolt 456 are formed from aluminum, and the end wall and sidewall of can 12 are formed from a steel material.

As shown in FIG. 6, probe 440 includes an outer sheath 460. Outer sheath 460 is formed from a non-electrically conductive material. The outer surface of sheath 460 is rigidly coupled to the inner surface of the central channel of bolt 456. In one embodiment, an adhesive bonds the outer surface of sheath 460 to the inner surface of the central channel of bolt 456. Sheath 460 includes a hollow central cavity, and an inner wire or lead 462 is located within the central cavity of sheath 460. Inner lead 462 is coupled to lead 442, and in the embodiment shown, is integral with lead 442. Inner lead 462 extends from lead 442 to a sensing element 464 located near the inner or distal tip of sheath 460. Sensing element 464 is located in the geometric center of can 12 such that sensing element 464 is positioned to read the temperature of the contents of can 12 at the coolest point. In one embodiment, sensing element 464 is located between the geometric center of can 12 and the distal end wall 22, which in some embodiments is the location of the coolest part of the can. Sheath 460 is hermetically sealed around sensing element 464 and inner lead 462 to protect these elements from damage that may occur during installation and handling or that may occur due to corrosion caused by the contents of can 12.

In one embodiment, bolt 456 is permanently coupled to sheath 460. This embodiment permits easy re-use of probe 440 to provide temperature readings for multiple cans 402. In such embodiments, for each can 12 to be heated within coil 14, a rivet 452 is installed through the end wall of the can to be heated. Then probe 440 and bolt 456 is inserted through the central channel of rivet 452 until the lower most end of bolt 456 reaches the central channel of rivet 452. Next, bolt 456 is threaded into the central channel of rivet 452, and once bolt 456 is fully engaged with rivet 452, lead 442 is coupled to wireless transmitter 420. Following heating of can 12 and reading of the temperature data, the coupling process is reversed to decouple probe 440 from can 12 allowing probe 440 to be used to measure the temperature of the next can to be heated within system 10.

Probe 440 is a sensor configured to generate a signal indicative of the temperature within the contents of can 12 during heating by coil 14. In one embodiment, probe 440 is a resistance temperature detector probe. In one specific embodiment, probe 440 is a platinum based resistance temperature detecting probe in which sensing element 464 is formed from platinum. In another embodiment, probe 440 is a thermocouple, a fiber optic sensor, or a similar temperature detector, which generates an electric signal, an optical signal, an acoustic signal, or mechanical stress/strain signal that varies with temperature in a known relationship.

Referring to FIG. 7, an induction can heating system 50 is shown according to an exemplary embodiment. In general, can heating system 50 is an induction heating system configured to heat and sterilize a plurality of filled and hermetically seal food cans, and may be a commercial scale heating system capable of can throughput of more than 100, 200 or 500 cans per minute. In general, system 50 includes various monitoring devices and control systems to confirm that sufficient energy has been delivered to the contents of each can 12 that passes through heating system 50 to sterilize can 12.

System 50 includes a container mover or can mover 24, shown as a conveyor type can mover, that is configured to move cans 12 through the various portions of system 50. In the embodiment shown in FIG. 7, a plurality of cans 12 are shown located next to each other along can mover 24, such that each can 12 moves sequentially through the various sections of system 10. In other embodiments, the can mover of system 50 is any suitable device of moving cans within an induction coil and/or through a can heating system. In specific additional embodiments, the can mover of system 50 may include rotating wheels with pockets and/or can filled tubes for holding cans during induction heating. In the exemplary embodiment shown, system 10 includes a preheating section, shown as preheating chamber 52, a heating section, shown as heating chamber 54, and a cooling section, shown as cooling chamber 56.

Preheating chamber 52 is an initial heating area configured to raise the temperature of cans 12 above ambient temperature prior to the cans entering the primary heating chamber 54. In the embodiment shown, preheating chamber 52 heats cans 12 using a non-induction heat sources (e.g., heat supplied from recycling heat from other portions of the system). In various embodiments, the temperature within preheating chamber 52 is between 70 and 212 degrees Fahrenheit, specifically is between 90 and 170 degrees Fahrenheit, and more specifically is between 110 and 150 degrees Fahrenheit.

After leaving preheating chamber 52, cans 12 move into heating chamber 54. Generally, heating chamber 54 includes an induction heating coil, shown as induction coil 58. Coil 58 is shown surrounding (e.g., wrapping around) can mover 24 such that can mover 24 passes through induction field area 60 defined by the inner surface of coil 58. Cans 12 move through the induction field area 60 of coil 58 on can mover 24 such that cans 12 move sequentially through heating chamber 54.

Coil 58 generally operates similarly to coil 14 as discussed above, and coil 58 is a coil formed from an electrically conductive material (e.g., copper, hollow copper tube, etc.) such that application of an alternating current to coil 58 generates an alternating magnetic field within induction field area 60 of coil 58. In the embodiment shown, cans 12 are made from an electrically conductive material, specifically a metal material, such that the magnetic field generated within coil 58 induces current (e.g., eddy currents) within the body and/or end walls (e.g., end panels of a three piece can, an integral end wall of a two piece can, etc.) of cans 12. The induced current causes resistive heating of the body and end walls of cans 14, which in turn heats the contents of can 12.

In various embodiments, sealed cans 12 may be subjected to induction heating within the induction coil of heating chamber 54 for between 10 seconds and 4 minutes, specifically between 15 seconds and 3 minutes, and more specifically between 20 seconds and 2 minutes. Then, following heating for the selected time, the can may be removed from the induction field to allow the heat imparted to the can while within the induction coil to transfer throughout the contents of the can to finish heating of the contents.

In addition to moving cans 12 sequentially through coil 58, in one embodiment, can mover 24 is configured to cause rotation of cans 12 about the longitudinal axis of each can 12 as cans 12 move through at least heating section 54. It should be understood, that as used herein the longitudinal axis of cans 12 is the axis of the can perpendicular to and passing through the center point of the can end wall of each can. In various embodiments, can mover 24 may be configured to rotate cans about the can's longitudinal axis at relatively fast rotational rates. In various embodiments, can mover 24 is configured to rotate cans about the can's longitudinal axis at a speed greater than 50 rpm, specifically between 50 rpm and 300 rpm, and more specifically between 88 rpm and 200 rpm. In more specific embodiments, can mover 24 is configured to rotate cans about the can's longitudinal axis at a speed between 88 rpm and more specifically 180 rpm depending on the viscosity of the canned product. In another embodiment, can mover 24 is configured to rotate cans about the can's longitudinal axis at a speed greater than 50 rpm, between 50 rpm and 600 rpm, and more specifically between 50 rpm and 300 rpm. In more specific embodiments, can mover 24 is configured to rotate cans about the can's longitudinal axis at a speed between 50 rpm and 200 rpm, specifically between about 100 rpm and 200 rpm, and more specifically between 85 rpm and 150 rpm. In another embodiment, can mover 24 is configured to rotate cans about the can's longitudinal axis at a speed between 80 rpm and 600 rpm.

In addition, can mover 24 may be configured to oscillate or agitate cans 12 to facilitate heat transfer within the contents of the can. The oscillation or agitation generated by can mover 24 may be provided in addition to or in place of rotation of cans 12. In one embodiment, can mover 24 is configured to cause end over tumbling and/or twisting of cans 12 as cans move along can mover 24.

Similar to system 10 discussed above, system 50 is configured to monitor power drawn by coils 58 and to confirm that each can 12 has received a predetermined amount of energy that has been determined to result in the sterilization of the contents of can 12. Thus, system 50 includes a power monitoring device 28 as discussed above. System 50 also includes a can monitoring device 62 that is configured to monitor or determine the amount of time that each can resides within induction coil 58. In one embodiment, can monitoring device 62 monitors the real-time speed and position of each can 12 such that can monitoring device 62 provides data related to the amount of time each can 12 resides in each incremental position within coil 58.

System 50 includes a control system 32, and in various embodiments, control system 32 is configured to provide all or any combination of the functionality described herein. In another embodiment, control system 32 is configured to determine that sufficient energy has been delivered to the contents of each can 12 that passes through heating system 50 to sterilize can 12. In one such embodiment, control system 32 is configured to determine the amount of energy received by each can 12 from the induction heating coil 58 based upon monitored power data received from power monitoring device 28 and based upon the determined time that each can 12 spent within induction coil 58 received from can monitoring device 62.

Referring to FIG. 8, a schematic diagram illustrating an algorithm that control system 32 implements to determine energy received by the contents of can 12 from induction coil 58 is shown according to an exemplary embodiment. In one embodiment, control system 32 implements an algorithm, shown as equation 80, to determine the energy received by can 12 from induction coil 58. As shown, control system 32 integrates the measured power (shown as volts times amps in equation 80) to determine energy received by can 12. In one embodiment in which a can is moving along an induction coil path, energy is determined by integrating equation 80 with respect to both time and position. In addition, control system 32 determines the amount of energy received based on an efficiency coefficient determined as discussed above. In various embodiments, equation 80 demonstrates that the magnetic field generated by the induction coil is proportional to the amperage flowing through coil and the distance between the induction coil and the metal surface (here the can) in which current is being induced.

As noted above, cans 12 move through coil 58, and in various embodiments the magnetic field generated by coil 58 does not have a constant intensity at all points along the path of coil 58. Thus in one embodiment, control system 32 utilizes a field intensity map 82 in conjunction with position and speed data of each can 12 to calculate the energy received by each can. Utilization of field intensity map 82 in the calculation of received energy allows control system 32 to account for variability in the magnetic field along the length of induction field area 60 and variability in the speed with which each can traverses coil 58.

In one embodiment, a system and method for generating the magnetic field intensity map 82 shown FIG. 8 is provided. In one such embodiment, coil 58 is energized by a DC current, and a Hall effect magnetometer is moved through coil 58 allowing control system 32 to record the magnetic field intensity readings along the path of coil 58 to generate map 82. Even though an AC current will be used to energize coil 58 during induction heating of cans 12, the DC current magnetic field intensity map 82 will be proportional to the magnetic field generated under AC current, and therefore will allow the energy calculation performed by control system 32 to account for magnetic field variability.

In one embodiment, control system 32 is configured to control induction coil 58 and/or can mover 24 based on the real-time determination of energy delivered to each can 12. In various embodiments, control system 32 is configured to increase current to induction coil 58 and/or slow down can mover if control system 32 determines that cans 12 received less than a predetermined threshold energy amount during traversal of a portion of coil 58. The increase in current to induction coil 58 and/or leaving cans 12 in the induction coil for more time by slowing down can mover 24 will increase the amount of energy received by cans 12 to ensure that the total energy received by can 12 exceeds the predetermined energy threshold needed for sterilization as discussed above.

In various embodiments, the various induction heating systems and/or induction coils discussed herein may include or utilize any of the concepts discussed in U.S. application Ser. No. 13/832,573, filed Mar. 15, 2013, or discussed in U.S. Application No. 62/031,010, filed Jul. 30, 2014, both of which are incorporated herein by reference in their entireties.

Figure 9:
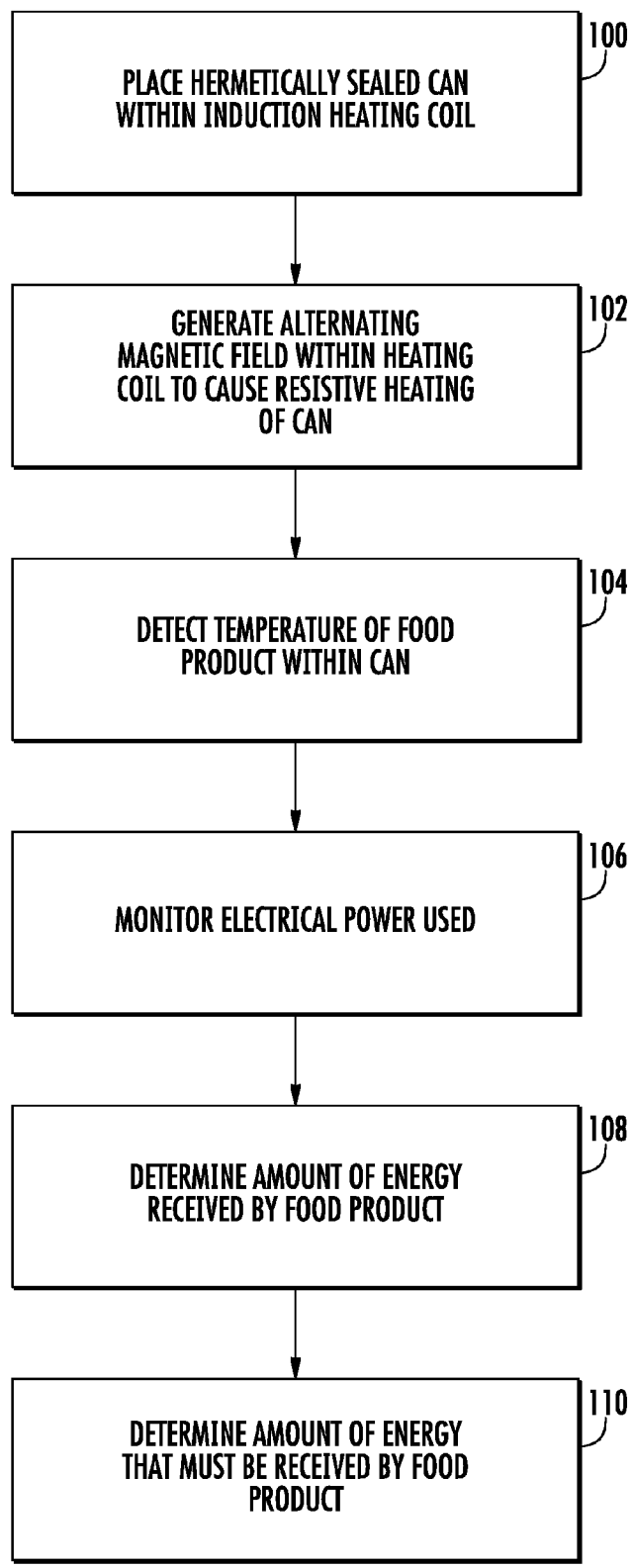
FIG. 9 shows a method of using induction heating to heat and sterilize a metal food can using induction heating according to an exemplary embodiment.

FIG. 9 shows a method of using induction heating to heat and sterilize a metal food can using induction heating according to an exemplary embodiment. At step 100, a hermetically sealed can, such as a metal food can, is placed within an induction heating coil. At step 102, an alternating magnetic field is generated within the induction heating coil causing resistive heating of the sealed can. At step 104, the temperature of the food product within the can is detected, such as by direct measurement using RTD 18. At step 106, the amount of electrical power used by the induction heating coil during induction heating is monitored. At step 108, the amount of energy received by the food product within the can is determined based on the amount of electrical power used by the induction heating coil. At step 110, the amount of energy that must be received by the food product within the can such that the temperature of the food product remains above a predetermined temperature threshold for a predetermined amount of time is determined. In various embodiments, the predetermined amount of time is inversely proportional to the predetermined temperature threshold.

Figure 10:
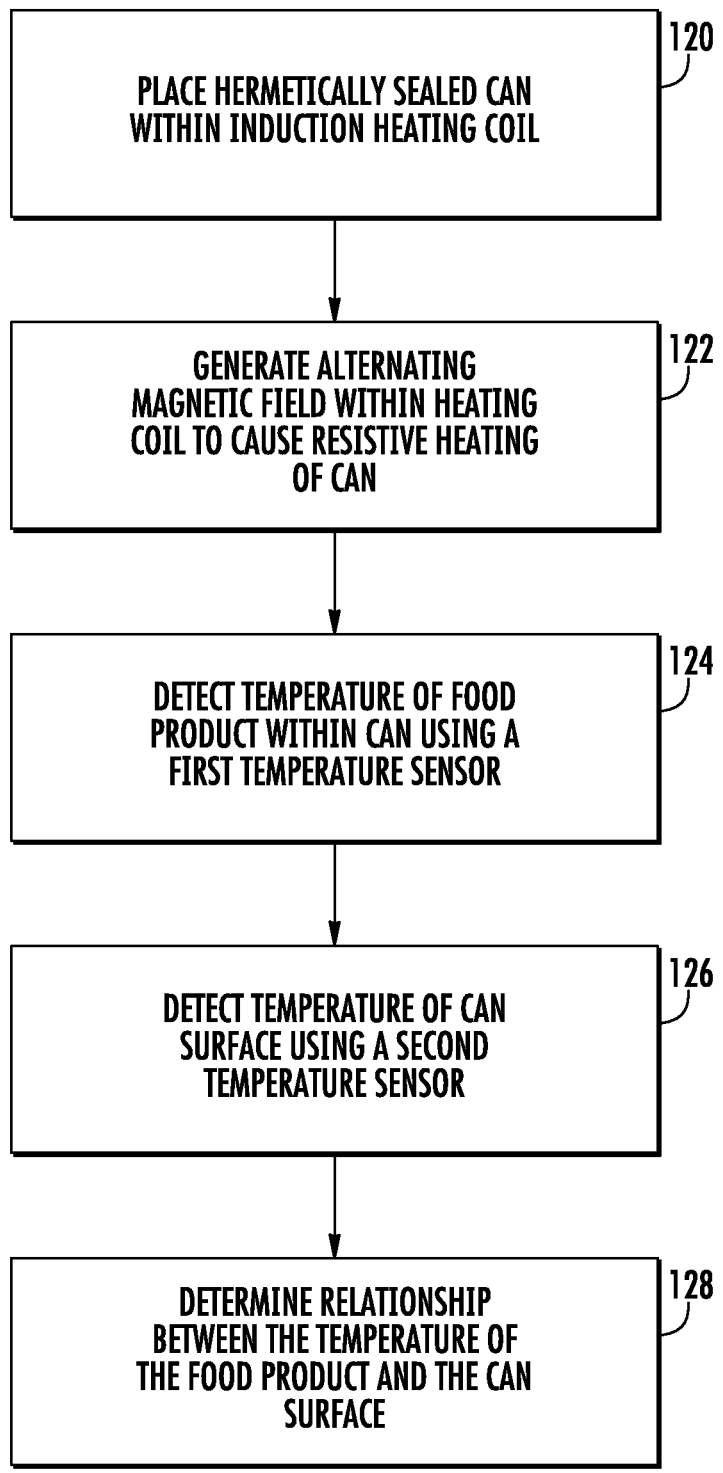
FIG. 10 shows a method of using induction heating to heat and sterilize a metal food can according to an exemplary embodiment.

FIG. 10 shows a method of using induction heating to heat and sterilize a metal food can according to another exemplary embodiment. At step 120, a hermetically sealed can, such as a metal food can, is placed within an induction heating coil. At step 122, an alternating magnetic field is generated within the induction heating coil causing resistive heating of the sealed can. At step 124, the temperature of the food product within the sealed can is determined during induction heating via a first temperature sensor, such as RTD 18, located with the metal food can. At step 126, the temperature of a surface of the metal food can is determined during induction heating via a second temperature sensor, such as external temperature sensor 20, located outside of the metal food can. At step 128, the relationship between the temperature of the food product within the metal food can and the temperature of the surface of the metal food can during induction heating is determined. In various embodiments, the determined relationship between the temperature of the can contents and exterior surface temperature of the metal food can is determined as a function of time that the metal can spends within the alternating magnetic field.

Figure 11:
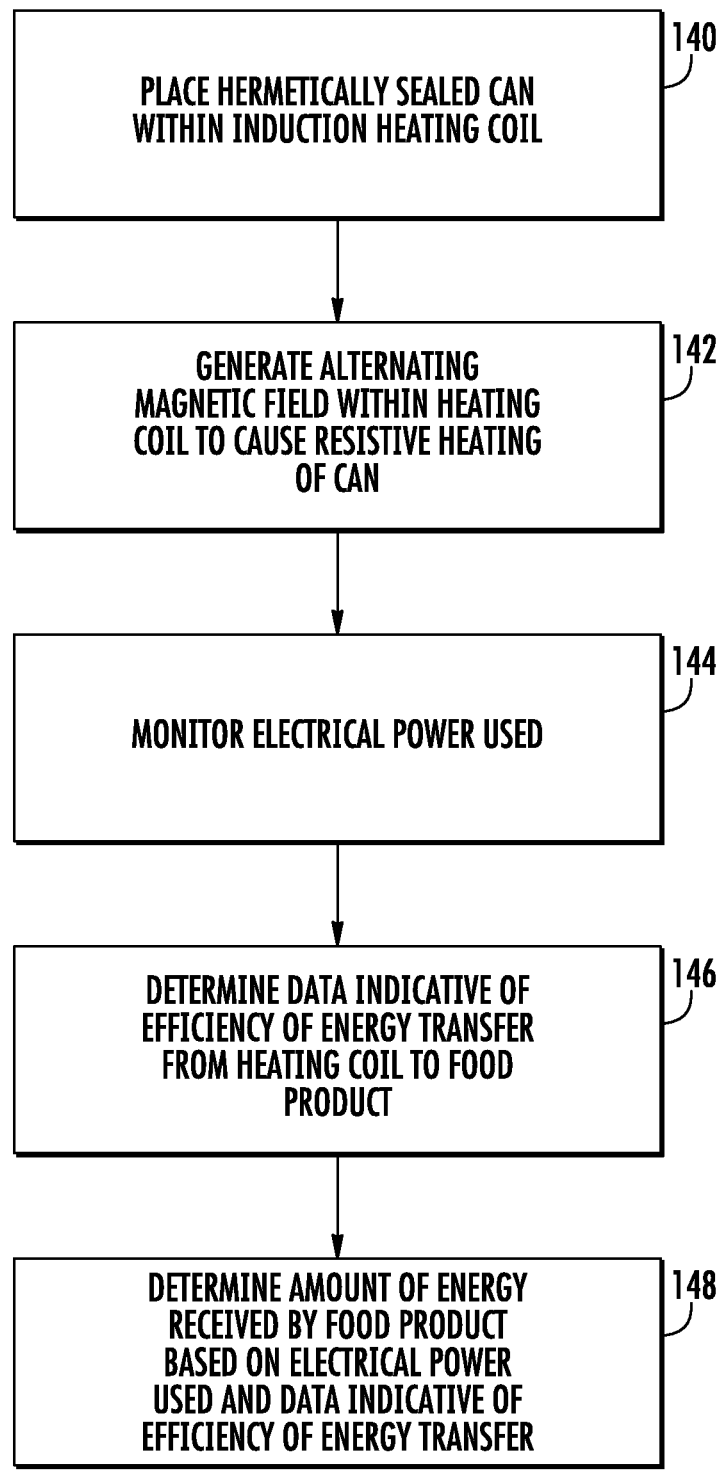
FIG. 11 shows a method of using induction heating to heat and sterilize a metal food can according to an exemplary embodiment.

FIG. 11 shows a method of using induction heating to heat and sterilize a metal food can according to another exemplary embodiment. At step 140, a hermetically sealed can, such as a metal food can, is placed within an induction heating coil. At step 142, an alternating magnetic field is generated within the induction heating coil causing resistive heating of the sealed can. At step 144, the amount of electrical power used by the induction heating coil during heating of the metal can is monitored. At step 146, data indicative of the efficiency of energy transfer from the induction coil to the food product within the metal food can is determined. At step 148, the amount of energy received by the food product within the can is determined. In various embodiments, this amount of energy is determined based upon the electrical power used by the induction heating coil and based upon the determined data indicative of the efficiency of energy transfer. In various embodiments, the method may include the step of determining the intensity of the magnetic field along a path through the induction heating coil, and in such embodiments, the data indicative of the efficiency of energy transfer from the induction coil to the food product within the food can includes intensity of the magnetic field generated by the induction coil.

According to exemplary embodiments, control system 32 may generally be any electronic control unit or circuit suitable to provide the various induction heating functionalities discussed herein. For example control system 32 may include one or more processing circuits having hardware (e.g., processors, memory, communication interfaces, etc.) and/or software configured to control the operation of the various induction heating systems and methods as discussed herein.

According to exemplary embodiments, the containers or cans discussed herein may be formed of any material that may be heated by induction, and in specific embodiments, the containers discussed herein are cans formed from stainless steel, tin-coated steel or tin-free steel (TFS).

Cans and containers discussed herein may include containers of any style, shape, size, etc. For example, the containers discussed herein may be shaped such that cross-sections taken perpendicular to the longitudinal axis of the container are generally circular. However, in other embodiments the sidewall of the containers discussed herein may be shaped in a variety of ways (e.g., as having other non-polygonal cross-sections (oval, elliptical, etc.), as a rectangular prism, a polygonal prism, any number of irregular shapes, etc.) as may be desirable for different applications or aesthetic reasons. In various embodiments, the sidewall of cans 14 may include one or more axially extending sidewall sections that are curved radially inwardly or outwardly such that the diameter of the can is different at different places along the axial length of the can, and such curved sections may be smooth continuous curved sections. In one embodiment, cans 12 may be hourglass shaped. Cans 12 may be of various sizes (e.g., 3 oz., 8 oz., 12 oz., 15 oz., 28 oz, etc.) as desired for a particular application.

Further, a container may include a container end wall (e.g., a closure, lid, cap, cover, top, end, can end, sanitary end, "pop-top", "pull top", convenience end, convenience lid, pull-off end, easy open end, "EZO" end, etc.). The container end wall may be any element that allows the container to be sealed such that the container is capable of maintaining a hermetic seal. In an exemplary embodiment, the upper can end may be an "EZO" convenience end, sold under the trademark "Quick Top" by Silgan Containers Corp.

In various embodiments, the can ends or end panels are coupled to the can body via a "double seam" formed from the interlocked portions of material of the can sidewall and the can end. However, in other embodiments, the end walls discussed herein may be coupled to the sidewall via other mechanisms. For example, end walls may be coupled to the sidewall via welds or solders. As shown above, the containers discussed herein are three-piece cans having an upper can end (e.g., an upper can end panel), a lower can end (e.g., an upper can end panel) and a sidewall each formed from a separate piece of material. However, in other embodiments, a two-piece can (i.e., a can including a sidewall and an end wall that are integrally formed and a separate can end component joined to the sidewall via a double seam) may be heated via an induction heating system as discussed herein.

In various embodiments, the upper can end wall may be a closure or lid attached to the body sidewall mechanically (e.g., snap on/off closures, twist on/off closures, tamper-proof closures, snap on/twist off closures, etc.). In another embodiment, the upper can end wall may be coupled to the container body via the pressure differential. The container end wall may be made of metals, such as steel or aluminum, metal foil, plastics, composites, or combinations of these materials. In various embodiments, the can end walls, double seams, and sidewall of the container are adapted to maintain a hermetic seal after the container is filled and sealed.

The containers discussed herein may be used to hold perishable materials (e.g., food, drink, pet food, milk-based products, etc.). It should be understood that the phrase "food" or food product used to describe various embodiments of this disclosure may refer to dry food, moist food, powder, liquid, or any other drinkable or edible material, regardless of nutritional value. In other embodiments, the containers discussed herein may be used to hold non-perishable materials or non-food materials. In various embodiments, the containers discussed herein may contain a product that is packed in liquid that is drained from the product prior to use. For example, the containers discussed herein may contain vegetables, pasta or meats packed in a liquid such as water, brine, or oil.

According to various exemplary embodiments, the inner surfaces of the upper and lower end walls and the sidewall may include a liner (e.g., an insert, coating, lining, a protective coating, sealant, etc.). The protective coating acts to protect the material of the container from degradation that may be caused by the contents of the container. In an exemplary embodiment, the protective coating may be a coating that may be applied via spraying or any other suitable method. Different coatings may be provided for different food applications. For example, the liner or coating may be selected to protect the material of the container from acidic contents, such as carbonated beverages, tomatoes, tomato pastes/sauces, etc. The coating material may be a vinyl, polyester, epoxy, EVOH and/or other suitable lining material or spray. The interior surfaces of the container ends may also be coated with a protective coating as described above.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. An induction heating system configured to heat a metal food can using induction heating comprising:
an induction heating coil generating an alternating magnetic field;
a hermetically sealed metal can positioned within the magnetic field generated by the induction coil, the sealed metal can including a food product within the sealed metal can, the magnetic field causing resistive heating of the metal of the sealed metal can;
a temperature sensing element located within the hermetically sealed can configured to detect the temperature of the food product during heating;
a power monitoring device configured to detect the power delivered to the induction heating coil; and a control system in communication with the temperature sensing element and the power monitoring device, the control system configured to store data indicative of the temperature of the food product detected by the temperature sensing element and to store data indicative of the power delivered to the induction heating coil detected by the power monitoring device, wherein the control system is configured to determine a relationship between power delivered to the induction heating coil and the temperature of the food product within the sealed metal can;

wherein the control system is configured to determine the amount of energy delivered into the food product of the sealed metal can based on the data indicative of the power delivered to the induction heating coil, and wherein the determined relationship is a relationship between the amount of energy delivered into the food product of the sealed can and the temperature of the food product within the sealed metal can.

2. The induction heating system of claim 1 wherein the control system is configured to determine the amount of energy delivered into the food product of the sealed metal can based upon data indicative of the efficiency of energy transfer from the induction coil to the metal of the food can.

3. The induction heating system of claim 1 wherein the control system is configured to determine the amount of energy delivered into the food product of the sealed can based upon data indicative of the magnetic field intensity of the magnetic field generated by the induction coil.

4. An induction heating system configured to heat a metal food can using induction heating comprising:
 an induction heating coil generating an alternating magnetic field;
 a hermetically sealed metal can positioned within the magnetic field generated by the induction coil, the sealed metal can including a food product within the sealed metal can, the magnetic field causing resistive heating of the metal of the sealed metal can;
 a temperature sensing element located within the hermetically sealed can configured to detect the temperature of the food product during heating;
 a power monitoring device configured to detect the power delivered to the induction heating coil;
 a control system in communication with the temperature sensing element and the power monitoring device, the control system configured to store data indicative of the temperature of the food product detected by the temperature sensing element and to store data indicative of the power delivered to the induction heating coil detected by the power monitoring device, wherein the control system is configured to determine a relationship between power delivered to the induction heating coil and the temperature of the food product within the sealed metal can; and
 a second temperature sensor configured to detect the temperature of a surface of the can;
 wherein the control system is in communication with the second temperature sensor and is configured to store data indicative of the temperature of the surface of the food can detected by the second temperature sensor, wherein the control system is configured to determine a relationship between the temperature of the surface of the can and the temperature of the food product within the can.

5. The induction heating system of claim 4 wherein the second temperature sensor is an infrared temperature sensor and the surface of the can is an outer surface of an end wall of the can.

6. An induction heating system configured to heat a metal food can comprising:
 an induction heating coil generating an alternating magnetic field;
 a hermetically sealed metal can positioned within the magnetic field generated by the induction coil, the sealed metal can including a food product within the sealed metal can, the magnetic field causing resistive heating of the metal of the sealed metal can;
 an electrical power supply delivering power to the induction heating coil;
 a power monitoring device electrically coupled to the induction heating coil configured to generate a signal indicative of the power delivered to the induction heating coil by the electrical power supply; and
 a control system in communication with the power monitoring device, the control system configured to store power data based upon the signal indicative of the power delivered to the induction heating coil by the electrical power supply generated by the power monitoring device, wherein the control system is configured to determine an amount of energy delivered to the food product within the sealed metal can based upon the power data and based upon efficiency data indicative of the efficiency of energy transfer from the induction coil to the food product within the sealed metal can.

7. The induction heating system of claim 6 wherein the efficiency data includes data representative of magnetic field intensity within the induction heating coil.

8. An induction heating system configured to heat and substantially sterilize a metal food can using induction heating comprising:
 an induction heating coil generating an alternating magnetic field;
 a hermetically sealed metal can positioned within the magnetic field generated by the induction coil, the sealed metal can including a food product within the sealed metal can, the magnetic field causing resistive heating of the metal of the sealed metal can;
 a first temperature sensor located within the hermetically sealed can configured to generate a signal indicative of the temperature of the food product within the can while the can is within the induction coil;
 a second temperature sensor configured to generate a signal indicative of the temperature of a surface of the can; and
 a control system in communication with the first temperature sensor and the second temperature sensor, wherein the control system stores internal temperature data based upon the signal from the first temperature sensor and stores surface temperature data based upon the signal from the second temperature sensor, wherein the control system is configured to determine a correlation between the temperature of the food product within the can and the temperature of the surface of the can based upon the surface temperature data and the internal temperature data.

9. The system of claim 8 wherein the first temperature sensor is a resistance temperature sensor and the second temperature sensor is an infrared detector.

10. A food can heating system configured to heat and substantially sterilize a plurality of filled and hermetically sealed food cans comprising:

an induction heating coil configured to generate an alternating magnetic field causing resistive heating of the metallic material of the food can;
a can moving device configured to move cans into the induction heating coil prior to induction heating, to move cans while being heated by the induction heating coil and to move cans out of the induction heating coil after induction heating;
a power supply configured to supply alternating current to the induction heating coil;
a power monitoring system coupled to the induction heating coil and configured to measure electrical power delivered to the induction heating coil during a heating cycle;
a can monitoring device configured to determine the amount of time each can spends within the induction heating coil; and
a control system in communication with the power monitoring system and the can monitoring device and configured to determine the amount of energy received by each food can from the induction heating coil based upon the power delivered to the induction heating coil and based upon the determined time of the food can within the induction coil
wherein the induction heating coil heats multiple cans within the generated magnetic field, wherein the can moving device is configured to move multiple cans sequentially through the induction heating coil, wherein the can monitoring device is configured to detect both the position and speed of each can as the can moves through the induction heating system, wherein the determined time is determined based upon at least one of the detected position and the detected speed of the cans within the induction coil.

11. The food can heating system of claim 10 wherein the control system is configured to determine the amount of energy received by each can from the induction heating coil based upon data indicative of magnetic field intensity along the path of the induction heating coil, wherein the control system is configured to compare the determined amount of energy received by each can to a predetermined energy threshold representative of the minimum amount of energy needed to raise the temperature of the contents of the can above a predetermined threshold temperature for a predetermined amount of time sufficient to substantially sterilize the contents of the food can.

12. The food can heating system of claim 11 wherein the magnetic field intensity varies along the path of the induction heating coil.

13. The food can heating system of claim 12 wherein the control system is configured to determine the amount of energy received by each can from the induction heating coil based an efficiency factor indicative of the proportion of energy used by the induction heating coil in generating the alternating magnetic field that is delivered into contents within the can.

14. The food can heating system of claim 13 wherein the efficiency factor is an empirically determined coefficient less than 1.

* * * * *